(12) United States Patent
Manciet

(10) Patent No.: US 6,463,694 B1
(45) Date of Patent: Oct. 15, 2002

(54) CLOSED PESTICIDE DELIVERY AND RECOVERY SYSTEM

(76) Inventor: Edward Manciet, 3002 W. Mercer La., Phoenix, AZ (US) 85029

(*) Notice: Subject to any disclaimer, the term of this patent is extended or adjusted under 35 U.S.C. 154(b) by 0 days.

(21) Appl. No.: 09/680,868

(22) Filed: Oct. 6, 2000

(51) Int. Cl.⁷ .................................................. A01M 1/20
(52) U.S. Cl. ...................................... 43/124; 43/132.1
(58) Field of Search ............................... 43/124, 132.1, 43/900; 52/101

(56) References Cited

U.S. PATENT DOCUMENTS

| | | | |
|---|---|---|---|
| 2,246,731 A | * 6/1941 | Hill | 43/124 |
| 2,842,892 A | 7/1958 | Aldridge et al. | 43/124 |
| 2,862,765 A | * 12/1958 | Wing | 43/124 |
| 3,124,893 A | * 3/1964 | Glenn | 43/124 |
| 3,151,746 A | * 10/1964 | Reustle et al. | 43/124 |
| 3,513,586 A | * 5/1970 | Meyer et al. | 43/124 |
| 3,602,248 A | * 8/1971 | Peacock | 43/124 |
| 3,676,949 A | * 7/1972 | Ramsey | 43/124 |
| 3,782,026 A | * 1/1974 | Bridges et al. | 43/124 |
| 4,028,841 A | * 6/1977 | Lundwall | 43/124 |
| 4,625,474 A | 12/1986 | Peacock et al. | 52/101 |
| 4,742,641 A | * 5/1988 | Cretti | 43/124 |
| 4,893,434 A | * 1/1990 | Knipp et al. | 43/124 |
| 4,944,110 A | * 7/1990 | Sims | 43/124 |
| 5,007,197 A | 4/1991 | Barbett | 43/124 |
| 5,094,028 A | * 3/1992 | Hume | 43/124 |
| 5,184,418 A | 2/1993 | Fletscher | 43/124 |
| 5,319,878 A | * 6/1994 | Moffett et al. | 43/124 |
| 5,347,749 A | * 9/1994 | Chitwood et al. | 43/124 |
| 5,378,086 A | 1/1995 | Campbell, Jr. et al. | 43/124 |
| 5,390,440 A | * 2/1995 | Mihealsick | 43/124 |
| 5,394,642 A | 3/1995 | Takaoka | 43/124 |
| 5,542,207 A | * 8/1996 | Morris, Sr. | 43/124 |
| 5,819,466 A | 10/1998 | Aesch et al. | 52/101 |
| 5,876,665 A | * 3/1999 | Zalis | 43/132.1 |
| 5,960,854 A | 10/1999 | Aesch, Jr. | 43/124 |

* cited by examiner

Primary Examiner—Darren W. Ark
(74) Attorney, Agent, or Firm—Ellis, Venable & Busam

(57) ABSTRACT

A closed high-volume low-pressure pesticide delivery and recovery system including under building pesticide delivery tubing and a method of using the pesticide delivery tubing.

16 Claims, 5 Drawing Sheets

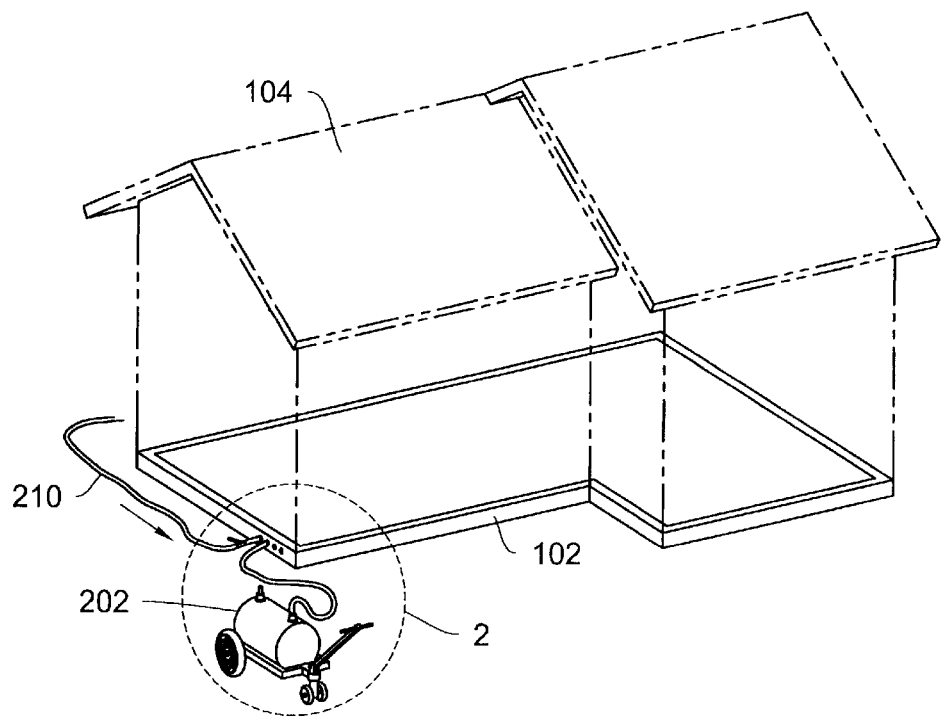
FIG. 1
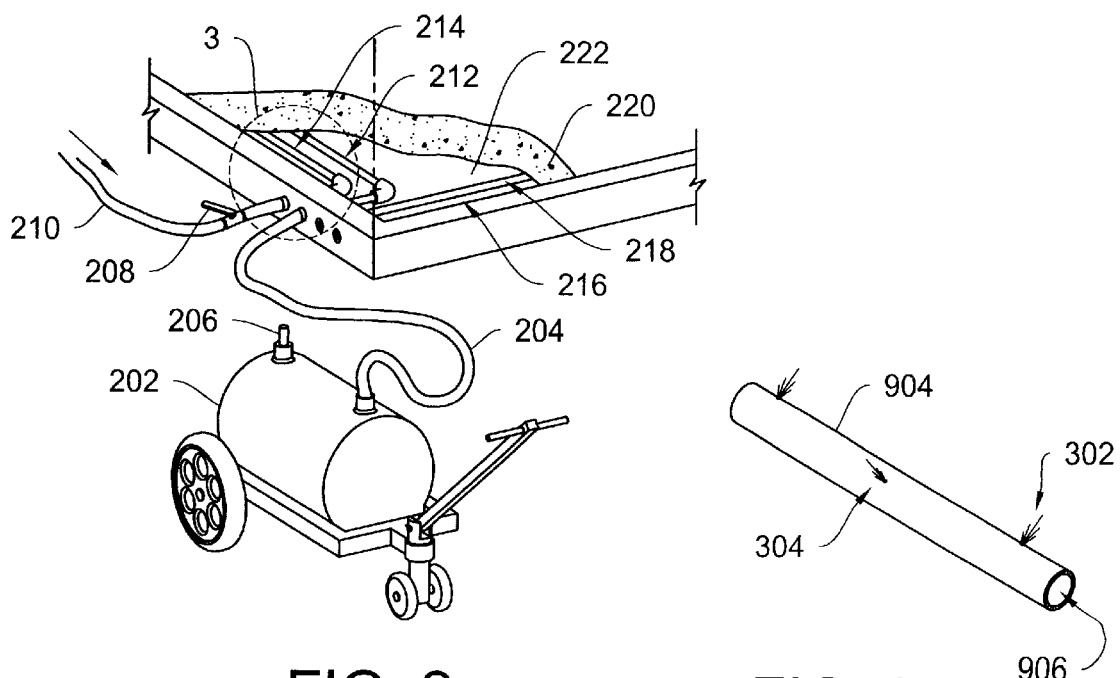
FIG. 2
FIG. 3

CLOSED PESTICIDE DELIVERY AND RECOVERY SYSTEM

FIELD OF THE INVENTION

The present invention relates to the field of systems for the control of termites and other pests that access building structures from underground. More particularly, the present invention relates to the field of distribution structures and methods of using the structures to control termites and other pests that access a building structure from underground.

BACKGROUND

Prior to the 1988 ban on the use of chlordane for termite protection, a single treatment of a building site prior to construction provided long-term protection against termites. The practice at that time entailed a single application to the soil prior to the pouring of foundations and cement slabs. Tests conducted as long as 52 years after such treatment indicated no signs of breakdown.

However, because of environmental problems associated with chlordane, other chemicals have had to be substituted. The chemicals in use today for termite control are considerable more expensive. Further, their effective life has not been reliably tested. Typically, the industry guarantees the life of such products applied as a pre-treat for only five years.

At the end of five years, the homeowner must decide whether to gamble and risk a termite invasion or to apply a re-treatment. When possible, the re-treatment consists of drilling holes no less than every two feet around the perimeter of the home and also adjacent to plumbing protrusions. The chemical is then injected, typically at the rate of four gallons per ten lineal feet. Frequently, the process becomes even more difficult and expensive. If the homeowner has planted trees or shrubs or has installed sidewalks or pools that interfere, it becomes necessary to apply treatment from inside the structure. This entails, in many cases, pulling up carpets, drilling holes through ceramic tiles and cement slabs and then applying the chemicals through the holes. After all this, and at a cost more than twice that of the original pre-treat, the re-treatment is typically only guaranteed one more year.

Accordingly, inventions involving structures and methods directed at a solution for preventative termite re-treatment have been heretofore disclosed in related art patents. The relevant related art patents have in common an underground distribution system comprised of tubes through which the termiticide is dispensed into the surrounding underground area. Examples of these inventions are disclosed in the patents listed below:

| U.S. Pat. No. | Inventor |
| --- | --- |
| 5,960,584 | Aesch, Jr. |
| 5,007,197 | Barbett |
| 5,184,418 | Fletscher |
| 5,819,466 | Aesch et al. |
| 5,394,642 | Takoaka |
| 5,378,086 | Campbell, Jr. et al. |
| 4,625,474 | Peacock, deceased et al. |
| 2,842,892 | Aldridge et al. |

What these patents fail to disclose or suggest is a structure or method of delivering termiticide that affects an effective delivery while minimizing the potentially adverse environmental impacts of delivering termiticide chemistry under a constructed building.

The prior art designs disclose "open systems" that use high pressure underground termiticide delivery systems that are accessible from an above ground access port. In other words, the prior art underground delivery systems do not disclose a system capable of recapturing residual termiticides. Accordingly, any residual termiticide that remains in the deliver system after treatment may out gas through the above ground access port of the underground delivery system.

Further, the use of high pressure delivery methods affects an inefficient delivery of termiticide. Maintaining a constant elevated pressure throughout an underground piping system during delivery is difficult. ordinarily, high pressure underground delivery systems result in pressure gradients throughout the underground delivery system. The magnitude and dispersion of the pressure gradients in the system depends on many variables including the overall length of the delivery system, the diameter of the delivery piping, the radius of curvature of the delivery system piping corners, the distance of the delivery aperture from the pressure source, and the circumference of the delivery apertures. However, the adverse effect of each of these variables, and as a result the magnitudes of the pressure gradients, is augmented by the use of a relatively high-pressure delivery source. Accordingly, the effectiveness of termiticide delivery can be improved through a low-pressure delivery system.

Thus, there is a need for a pesticide deliver system that offers an improved and safer alternative to this dilemma in the form of an underground termiticide delivery system for periodic or "as needed" pesticide applications after construction of buildings. The present invention enables high-volume pesticide delivery to underneath a building structure while minimizing airborne or above ground pesticide dispersal and exposure to people as a result thereof. Accordingly, the present invention provides a more effective barrier to pests while minimizing the adverse consequences of relatively high-pressure underground pesticide delivery systems.

SUMMARY OF THE INVENTION

The present invention is a closed pesticide delivery system comprising a pesticide delivery apparatus and method of using the pesticide delivery apparatus. The pesticide delivery apparatus comprises a low-pressure pesticide propellant source, a propellant recovery reservoir, a prewetting & purging source, underground pesticide delivery tubing, and above ground hoses to connect the components of the apparatus. The method of using the present invention comprises the steps of: 1) prewetting with a water-based solutions of the underground adjacent to the underground pesticide delivery tubing; 2) propelling a pesticide solution through the underground pesticide delivery tubing and into the underground adjacent to the underground delivery tubing; and 3) purging, and verifying the purge, of the underground pesticide delivery tubing. Implementations of the invention are contemplated wherein the pesticide comprises a termiticide. Alternate implementations are also contemplated wherein the pesticide comprises biologically active nematodes either in place of or in combination with the termiticide.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 1 depicts an embodiment of the present invention implemented on a building.

FIG. 2 depicts the detail within the encircled area of FIG. 1.

FIG. 3 depicts an embodiment of the tubing of the invention.

DESCRIPTION OF PREFERRED EMBODIMENTS

Figure 13:
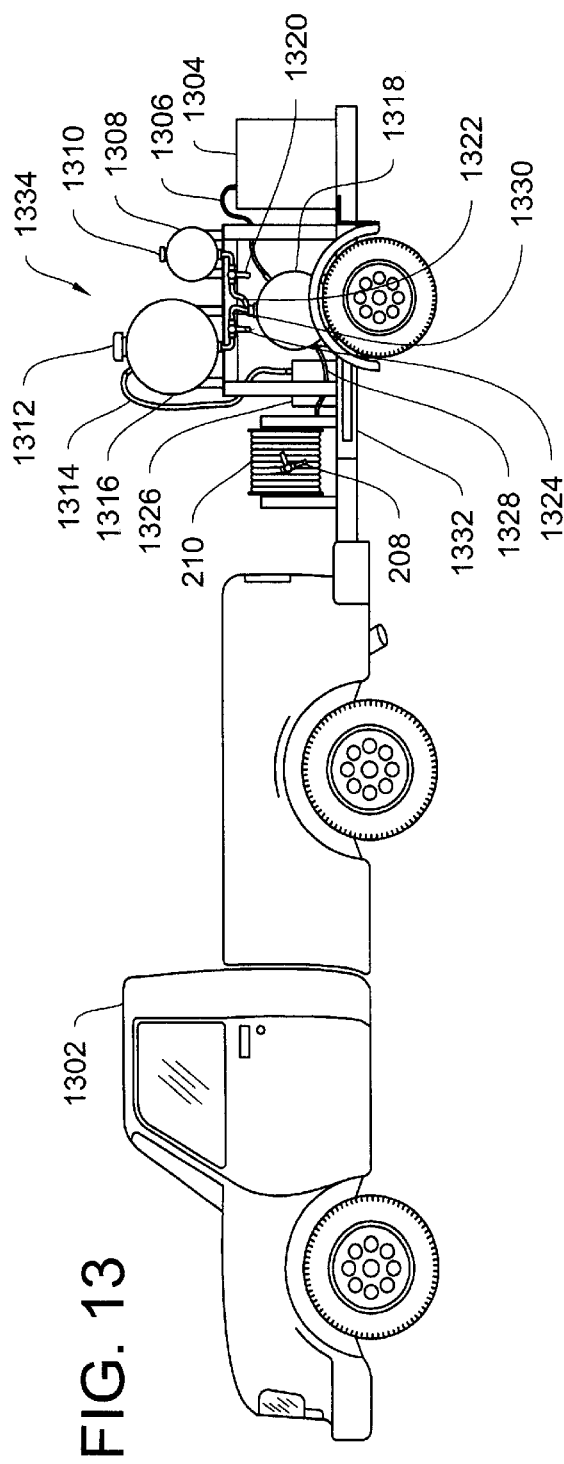
FIGS. 13 & 14 depict a preferred manner of delivering the service to a job site.
Figure 14:
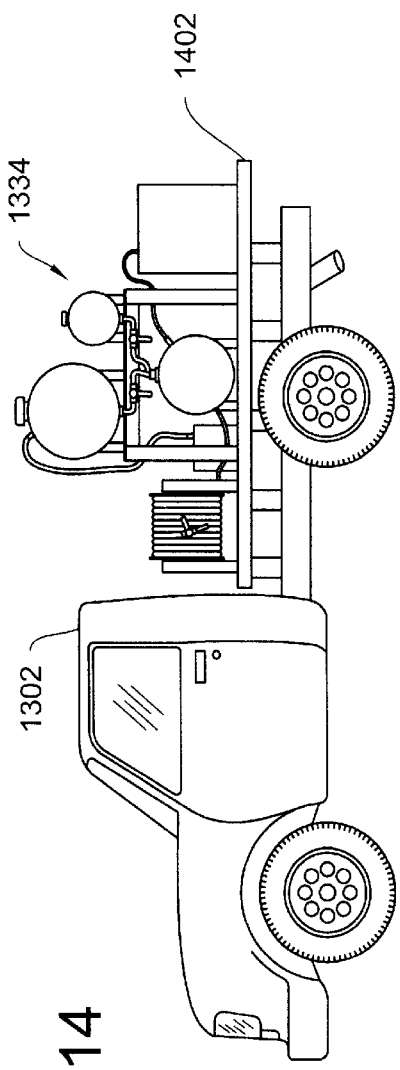

Referring to FIGS. 13 & 14, the preferred low-pressure pesticide source comprises a pesticide source tank 1316 coupled to a propellant mixture tank 1318 by a pesticide source line 1330 and controlled by a pesticide source valve 1324. A gas pressure generator 1304 (e.g. air compressor) is also coupled to the propellant mixture tank 1318 by a gas pressure generator line 1306. The preferred gas pressure generator 1304 is regulated to prevent damaging pressure potentials in the system that can be hazardous and costly to repair. The pesticide source tank 1316 further includes a pesticide source tank inlet 1312 and is coupled to a pesticide vapor recovery reservoir 1326 by a pesticide vapor recovery line 1314.

The preferred prewetting & purging source is implemented with a prewetting & purging solution source tank 1308 that is coupled to the propellant mixture tank 1318 by a prewetting & purging solution source line 1322 and controlled by a prewetting & purging solution control valve 1320. The propellant mixture tank 1318 is coupled by a propellant delivery line 1328 to a rolled propellant delivery line 210 that includes a propellant delivery control valve 208. FIGS. 13 & 14 also depict the preferred manner of transporting the pesticide source and prewetting & purging source to a jobsite (e.g. either by truck 1302 with trailer 1332 or by truck 1302 with flatbed 1402).

Figure 4:
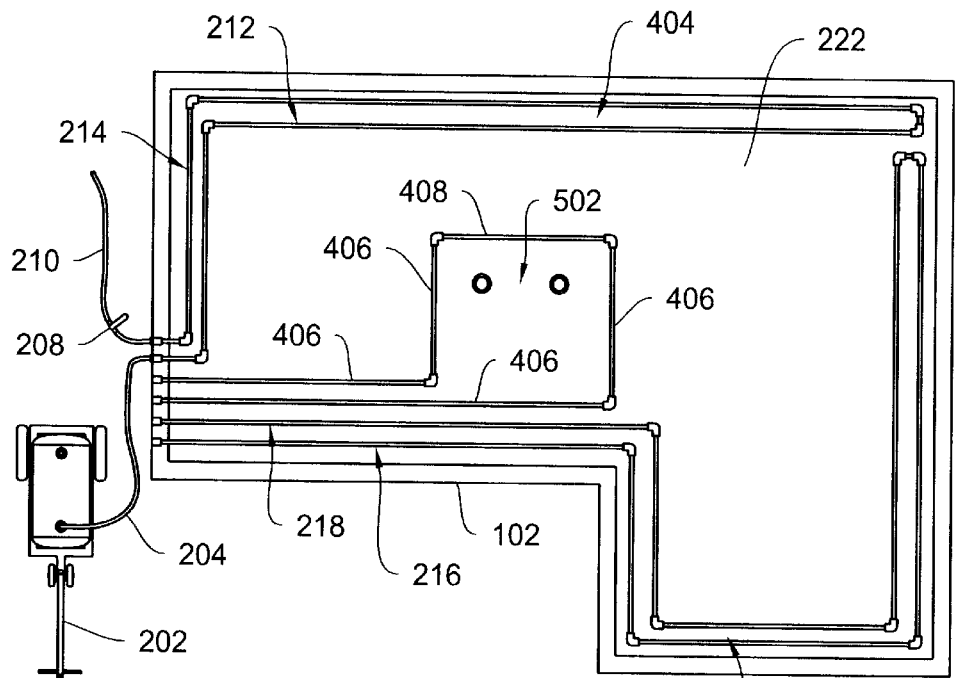
FIG. 4 depicts an embodiment of a first routing plan of the tubing of the invention.
Figure 5:
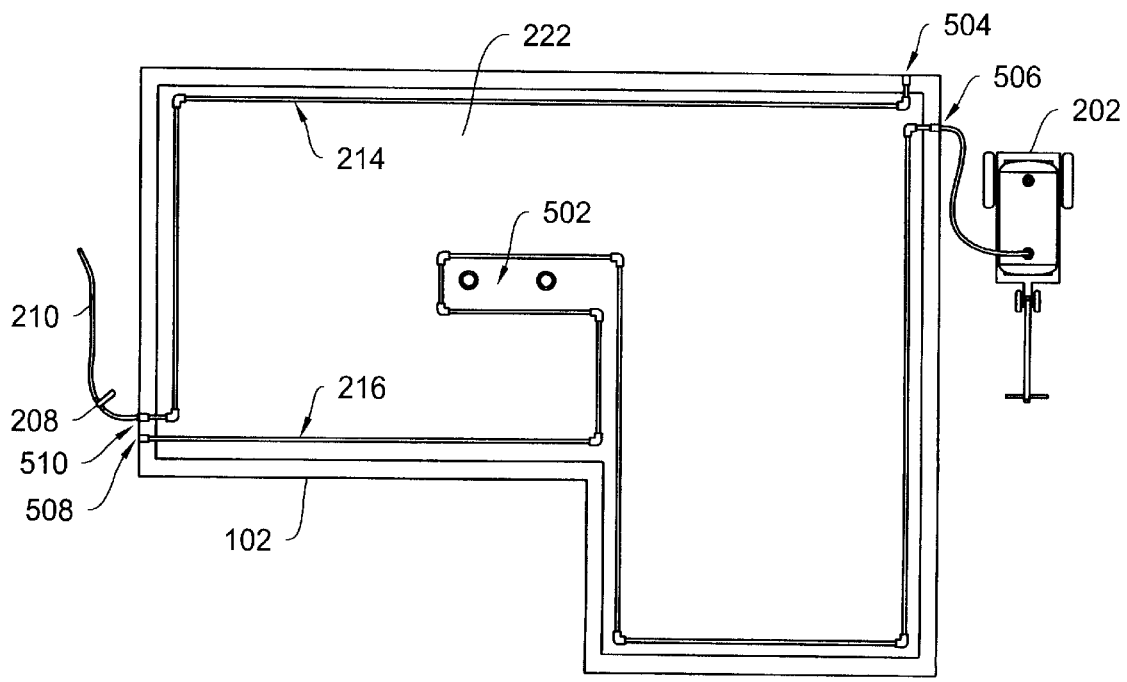
FIG. 5 depicts an embodiment of a second routing plan of the tubing of the invention.

Referring to FIG. 2, the underground pesticide delivery tubing is situated underneath the bottom slab 220 of the foundation a building 104 and within the fill 222 beneath the foundation perimeter 102. Moreover, alternate embodiments of the actual underground pesticide delivery tubing are possible as depicted in FIGS. 4 & 5. The underground pesticide deliver tubing is situated in the fill 222 beneath the building at areas that provide, the highest likelihood of access by pests. Preferably, the underground pesticide delivery tubing is routed in the fill 222 beneath and just inside the foundation perimeter 102 of the building 104. Moreover, the underground pesticide deliver tubing is routed through the fill 222 around any water and sewage apertures 502 that penetrate the bottom slab 220 of the foundation.

Pressure gradients in the underground pesticide delivery tubing effect a substantially unequal distribution of pesticide to the fill 222 beneath the building 104 and are therefore undesirable. Thus, preferred alternate routing plans for the underground pesticide delivery tubing as depicted in FIGS. 4 & 5 provide an ability minimize the potential pressure gradients in the delivery tubing. The routing plan in FIG. 5 is appropriate for larger foundation perimeters 102 where a return routing of the underground pesticide delivery tubing, as depicted in FIG. 4, would effect a undesirable or unworkable pressure gradient in the underground pesticide deliver tubing. The routing plan in FIG. 4 is also appropriate in regions of the country where pests pose a greater problem. The return routing effects a broader lateral distribution 402, 404, than does a single buried line of tubing.

Figure 12:
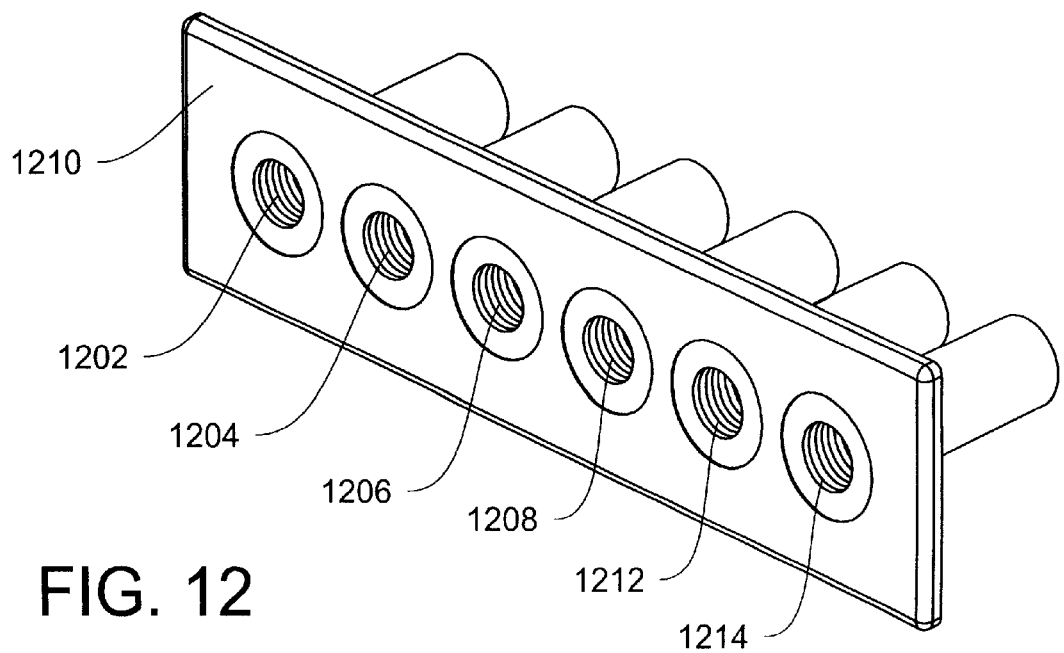
FIG. 12 depicts a plurality of access inlets and outlets.

At a jobsite, the propellant delivery line 210 is connected to a first inlet of the underground pesticide delivery tubing as depicted in FIGS. 1 & 2. FIG. 12 depicts several pesticide delivery tubing inlets and outlets 1202, 1204, 1206, 1208, 1212, 1214, that are tapped and adapted to receive a connector on the end of the propellant delivery line 210. Thereafter, the prewetting solution is dispersed from the pesticide source tank 1312 into the propellant mixture tank 1318 and mixed with pressurized air from the gas pressure generator 1304. The propellant delivery control valve 208 is opened and the prewetting solution is allowed to disperse into the underground pesticide delivery tubing. It is preferred that the gas pressure generator 1304 regulation prevent the pressure potential in the underground pesticide delivery tubing from exceeding 23 p.s.i. during dispersal of the prewetting solution. Finally, the pesticide and purging solutions are subsequently dispersed into the underground delivery tubing in a similar manner and with the same preferred pressure limit in the underground pesticide delivery tubing.

The propellant recovery reservoir is connected to the tubing outlet that corresponds with the corresponding tubing inlet and permits verification of the propellant dispersal throughout the underground pesticide delivery tubing. The preferred propellant recovery reservoir is a mobile propellant recovery tank 202, as depicted in FIGS. 1 & 2, to minimize the pressure potential necessary to effect the delivery of pesticide throughout the underground pesticide delivery tubing. The pesticide recovery tank 202 is coupled by a pesticide recovery tank inlet line 204 to the outlet access aperture of the underground pesticide delivery tubing. A second pesticide recovery tank valve 206 permits verification and recovery of propellant dispersal.

Figure 11:
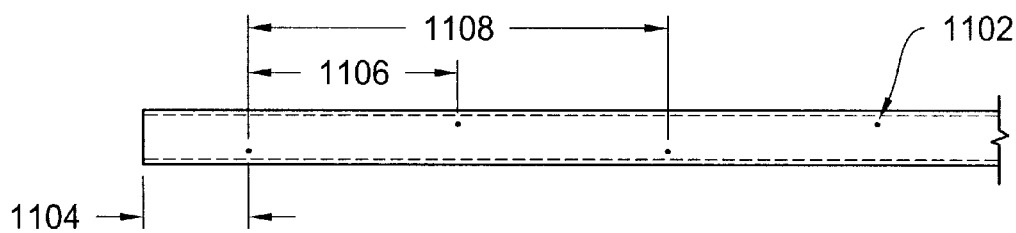
FIG. 11 shows the preferred alternating pesticide output aperture distribution.

FIGS. 3, and 9–11 depict the preferred distribution of underground pesticide delivery tubing pesticide output apertures. FIG. 11 shows the preferred alternating pattern of the 45-degree output aperture 902 and the 315-degree output aperture 1002 of FIGS. 9 & 10. The angles of the apertures are measured relative to a cross sectional vertical bisection of a representative portion of the underground pesticide delivery tubing. The preferred length between adjacent output apertures is no more than eighty inches. The preferred aperture diameter is less than one sixteenth of an inch in diameter.

Figure 6:
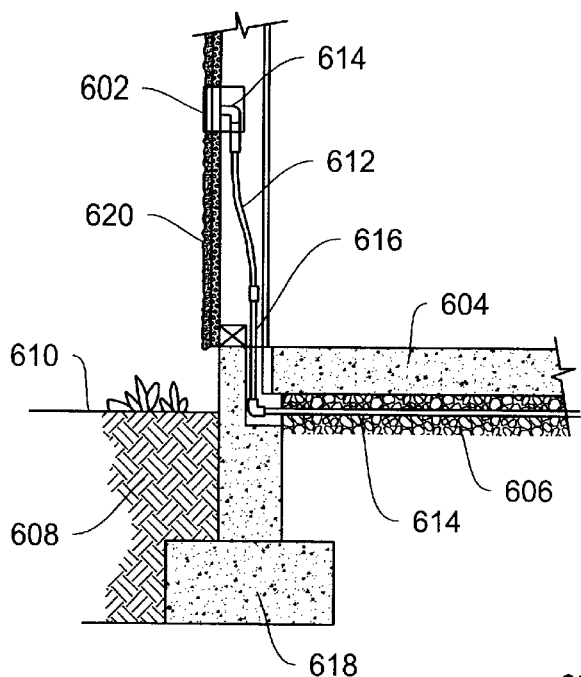
FIGS. 6, 7 & 8 depict alternate embodiments of access inlets or outlets implemented on a structure.
Figure 7:
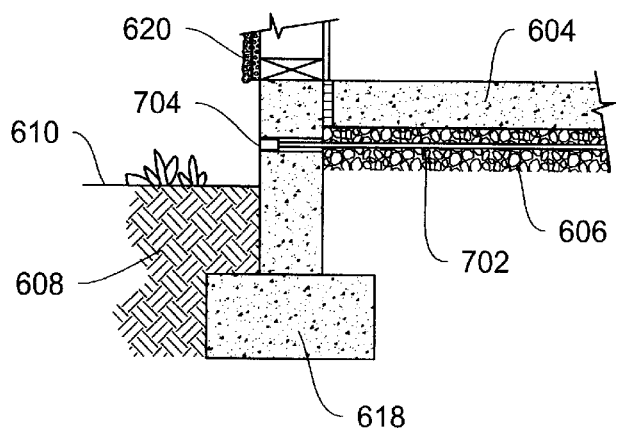
Figure 8:
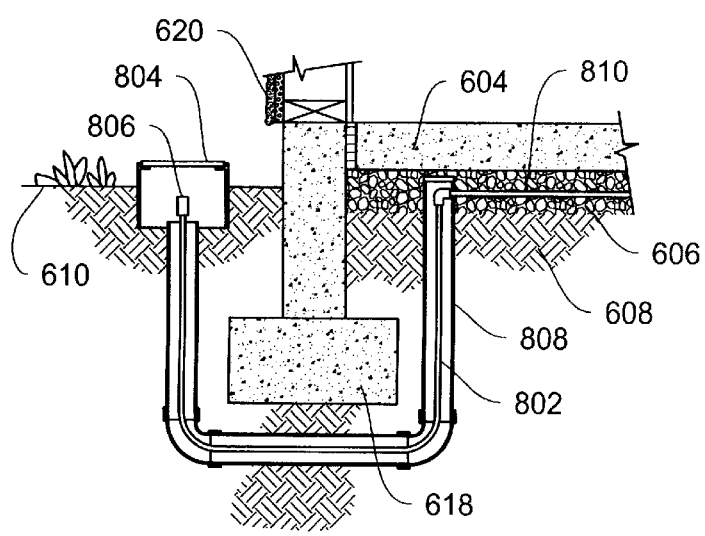
Figure 9:
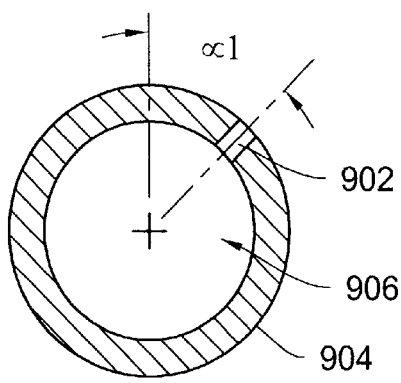
FIGS. 9 & 10 depicts the preferred orientation of the pesticide output apertures.
Figure 10:
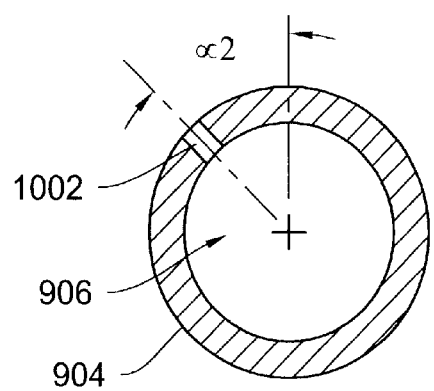

There exist various access structures to the underground pesticide deliver tubing. Three alternate embodiments are depicted in FIGS. 6, 7 and 8. FIG. 6 depicts a raised recessed pesticide inlet cavity 602 that houses an access aperture to the underground pesticide deliver tubing. FIG. 7 depicts an inline recessed inlet aperture 704. FIG. 8 depicts a partially sunken access inlet cavity 804 that is non-destructive to the building 104 structure.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. An underground solution distribution system, comprising:
   A. an underground delivery structure comprised of,
      i. tubing of one-inch diameter or greater having solution delivery apertures, and routed underneath and adjacent to a building foundation perimeter,
      ii. an inlet aperture and an outlet aperture connected to distal ends of the tubing;
   B. a propellant mixture tank, having
      i. a propellant mixture inlet,
      ii. a propellant mixture outlet that is attachable to the inlet aperture connected to the tubing, and
      iii. a gas-pressure source inlet that is attachable to a gas-pressure source;
   C. a pesticide solution source tank having a pesticide solution therein and coupled through a pesticide solution source tank valve to the propellant mixture inlet; and
   D. a prewetting and purging solution source tank having a prewetting and purging solution therein, and coupled through a prewetting and purging solution source tank valve to the propellant mixture inlet.

2. The underground solution distribution system in claim 1 wherein the solution delivery apertures alternate at forty five degrees and three hundred and fifteen degrees relative to a vertical bisection of the tubing cross section.

3. The underground solution distribution system in claim 1 wherein the prewetting and purging solution contains a surfactant.

4. The underground solution distribution system in claim 1 wherein the pesticide solution comprises biologically active nematodes.

5. The underground solution distribution system in claim 1 wherein the gas pressure source provides less than twenty three pounds per square inch from the propellant mixture outlet.

6. A method of distributing pesticide solution through an underground delivery structure and beneath a building foundation comprising the steps of:
   A. mixing pressurized gas and a wetting solution in a propellant mixture tank to formulate a wetting solution propellant;
   B. propelling the wetting solution propellant through the underground delivery structure;
   C. mixing pressurized gas and a pesticide solution in the propellant mixture tank to formulate a pesticide solution propellant;
   D. propelling the pesticide solution propellant through the underground delivery structure to create a biologically effective barrier beneath the building foundation;
   E. mixing pressurized gas and a purging solution to formulate a purging solution propellant;
   F. propelling the purging solution propellant through the underground delivery structure; and
   G. verifying at an above ground output valve that the structure is purged of the pesticide solution propellant.

7. The method of distributing pesticide solution in claim 6 wherein the wetting solution and the purging solution are the same solution.

8. The method of distributing pesticide solution in claim 6 wherein the wetting solution contains a surfactant.

9. The method of distributing pesticide solution in claim 6 further comprising capturing in a propellant recovery tank at least a portion of a solution selected from the group consisting of: the wetting solution propellant or the pesticide solution propellant.

10. The method of distributing pesticide solution in claim 6 further comprising capturing at least a portion of the purging solution propellant in a propellant recovery tank.

11. A method of distributing solutions through a distribution structure:
   A. providing a distribution structure comprising,
      i. an above ground input valve coupled to,
      ii. an underground distribution structure, further comprising,
         a) tubing having one-inch diameter or greater, and
         b) a plurality of solution delivery apertures in the tubing, each solution delivery aperture having a diameter of no greater than one sixteen of an inch, the tubing being further coupled to;

iii. an above ground output valve;

B. the method of distributing solutions through the distribution structure comprising the steps of, i. dispensing into the above ground input valve at less than 23 p.s.i. a quantity of a first solution sufficient to wet the length of tubing and the underground, ii. dispensing into the above ground input valve at less than 23 p.s.i. a quantity of a second solution comprising a termiticide, sufficient to create a biologically effective barrier in the underground, iii. dispensing into the above ground input valve at less than 23 p.s.i. a quantity of a third solution, sufficient to purge the length of tubing of the second solution, iv. verifying at the above ground output valve that the distribution structure is purged of the second solution.

12. The method in claim 11 wherein the first solution contains a surfactant.

13. The method in claim 11 wherein the second solution comprises biologically active nematodes.

14. The method in claim 11 wherein the steps of dispensing into the above ground input valve at less than 23 p.s.i. each solution is pressure regulated gas propelled.

15. The method in claim 11 wherein the step of verifying at the above ground output valve that the distribution structure is purged of the second solution comprises, distributing the third solution through the distribution structure and identifying its presence at the above ground output valve.

16. The method in claim 11 further comprising, capturing in a reservoir tank at least a portion of a solution selected from the group consisting of: the first solution, the second solution, or the third solution.

* * * * *